United States Patent

Park et al.

[11] Patent Number: 6,072,633
[45] Date of Patent: Jun. 6, 2000

[54] APPARATUS FOR SEPARATING A LIGHT BEAM BY USING TWO FLAT PLATES WITH AN AIR GAP THEREBETWEEN AND HYBRID DICHROIC MIRRORS AND A METHOD THEREFOR

[75] Inventors: Jung Ho Park, Sungnam; Young Jun Park, Euwang; Young Mo Hwang, Seoul; Yong Hoon Kim, Sungnam, all of Rep. of Korea

[73] Assignee: Samsung Electronics Co., Ltd., Suwon, Rep. of Korea

[21] Appl. No.: 09/090,244

[22] Filed: Jun. 4, 1998

[30] Foreign Application Priority Data

Jul. 12, 1997 [KR] Rep. of Korea ................. 97-32395

[51] Int. Cl.[7] ................................................. B02B 27/14
[52] U.S. Cl. .................................................... 359/634
[58] Field of Search ................................ 359/634, 589, 359/590

[56] References Cited

U.S. PATENT DOCUMENTS

| | | | |
|---|---|---|---|
| 4,125,864 | 11/1978 | Aughton | 359/298 |
| 4,533,215 | 8/1985 | Trias et al. | 350/347 E |
| 4,720,747 | 1/1988 | Crowley | 358/231 |
| 5,071,225 | 12/1991 | Inoue | 359/634 |
| 5,253,073 | 10/1993 | Crowley | 358/231 |
| 5,272,518 | 12/1993 | Vincent | 356/405 |
| 5,311,321 | 5/1994 | Crowley | 348/760 |
| 5,748,379 | 5/1998 | Salsman et al. | 359/634 |
| 5,825,551 | 10/1998 | Clarkson et al. | 359/629 |

FOREIGN PATENT DOCUMENTS 0 211 596  2/1987  European Pat. Off. .
55-25045   2/1980  Japan .

*Primary Examiner*—Ricky Mack
*Attorney, Agent, or Firm*—Burns, Doane, Swecker & Mathis, L.L.P.

[57] ABSTRACT

An apparatus for separating an incident light beam from a light source into three light beams having different colors by a mirror mechanism constructed in a particular way. The apparatus separates white-light into three colors of red, green, and blue and includes a first dichroic mirror, a wide band high-reflection mirror, a second dichroic mirror, and a material of air or gas. The first dichroic mirror allows only a light beam with a first wavelength to penetrate and reflects light beams with other wavelengths, from the incident light beam. The wide band high-reflection mirror reflects the light beam reflected from the first dichroic mirror within the material, and is positioned such that it is parallel to the first dichroic mirror and is spaced therefrom by a predetermined interval. The second dichroic mirror allows only a light beam with a second wavelength different from the first wavelength to penetrate in a direction that is parallel to the light beam with the first wavelength penetrated through the first dichroic mirror and reflects a light beam with a third wavelength different from the first and second wavelengths within the material. The wide band high-reflection mirror reflects the light beam which is reflected from the second dichroic mirror within material and then the reflected light beam with the third wavelength passes outside the material past the second dichroic mirror in a direction that is parallel to the light beam with the second wavelength penetrated through the second dichroic mirror. The material of air or gas is positioned between the first, second dichroic mirrors and the wide band high-reflection mirror, through which the incident light beam and the reflected light beams proceed.

6 Claims, 3 Drawing Sheets

(THE CONVENTIONAL ART)

APPARATUS FOR SEPARATING A LIGHT BEAM BY USING TWO FLAT PLATES WITH AN AIR GAP THEREBETWEEN AND HYBRID DICHROIC MIRRORS AND A METHOD THEREFOR

This application claims priority under 35 U.S.C. §§ 119 and/or 365 to 1997-32395 filed in Korea on Jul. 12, 1997; the entire content of which is hereby incorporated by reference.

FIELD OF THE INVENTION

The present invention relates to an apparatus for separating a white-light beam into three light beams of red, green, and blue, and a method for light separation in accordance with the apparatus. In the present invention, the incident light beam is separated into three light beams having three colors by the mirror mechanism that is constructed in a particular way.

The apparatus according to the invention can be used for a light separation apparatus which is used in a method of image projection that modulates light independently by a 3-channel acousto-optic modulator operating according to an image signal for each color and projects the modulated images with each single color of red, green, and blue on a screen. In addition to the above example, the apparatus according to the invention can be widely used, such as in a color scanner, a color copier (copying machine), etc.

DESCRIPTION OF THE RELATED ART

The prior typical means of light separation separates the light by using a prism or a dichroic mirror as illustrated in FIG. 3. However, it is not easy to achieve optical efficiency and optical alignment with such devices. Further, when the element of color separation is used in the prior laser projection display apparatus such as that disclosed in EPO 0,211,596 A2, there have been problems in that the composition is extremely complicated and the volume is massive.

The prior acousto-optic modulator using a method for light separation as disclosed in EPO 0,211,596 A2, modulates the light by using three lasers with a 600 nm band wavelength (red), a 500 nm band wavelength (green), and a 400 nm band wavelength (blue) respectively as the light source as a three-color light source for the input device. By using this light source, the system has to be very large-sized, and it is difficult to commercialize. Therefore, over time, the prior large systems have been simplified to be made into smaller systems. In one case, a white-laser (composed of krypton gas and argon gas) is used as a laser light source. The white-laser beam is separated into three-color light beams (red, green, and blue) using three dichroic mirrors as illustrated in FIG. 3. This method also uses three light separation mirrors and three optic-modulators respectively, so the system has disadvantage, in that it is not compact and it is too expensive.

U.S. Pat. No. 4,125,864 discloses that a plurality of parallel emergent beams of substantially equal intensity can be obtained from the incident light beam with a short wavelength for applying to the image copying system such as a printer. The patent discloses a beam splitter such that it separates a light beam with a single wavelength into a number of beams with substantially equal intensity. These beams contribute to the formation of the half-tone dots in the image, so the principle of operation is different from the present invention of a 3-channel light separator for a display.

Japanese Laid Open Patent No. 55-25045 discloses a method of optical wavelength division multiplexing-branching having an optical wavelength division multiplexor and an optical wavelength branching filter to transmit a number of optical wavelengths simultaneously in the methods of optical fiber transmission. The patent discloses an optical wavelength multi-branching filter for optical communication in which the wavelength range is an infrared range from 0.7 to 1.3, and it is made so as to filter the much narrower wavelength band using an interference band-pass filter that is comprised of a multi-layer dielectric. Thus, this apparatus is different from the present invention using a dichroic mirror for high-output laser application and high efficiency filtering. In addition, in the Japanese Patent, the interference band-pass filter is arranged in order of the particular wavelengths considering the optical transmission loss characteristics of optical fibers, and the fact that the interval between each outgoing wavelength and the parallel degree is not constant. In contrast, the present invention allows the optical filter to be arranged without consideration of optical transmission loss and is constructed so as to maintenance of parallel degrees between the outgoing beams.

Another prior art is disclosed in U.S. Pat. No. 5,071,225. The patent discloses a beam splitter that splits a single incident light beam having several wavelengths into the wavelength components, respectively. For each of the wavelengths separated, the apparatus splits those beams into a plurality of partial light beams having the same wavelengths.

A plurality of secondly split light beams having the same wavelengths of U.S. Pat. No. 5,071,225, have different intensities from one another. Additionally, they do not allow the parallel degrees between outgoing beams to be maintained because the beams are split due to the difference between the refractive indexes to medium by wavelengths and the outgoing angles of the outgoing beams are different from one another.

SUMMARY

The present invention relates to an apparatus for separating a light beam into three light beams having red, green, and blue colors, respectively, and a method for light separation in accordance with the apparatus.

The present invention is intended to provide an apparatus for light separation and a method of light separation using the apparatus for light separation which separates a single light beam into three light beams (red, green, and blue) by a system which is smaller than the prior art and which can be supplied at a low price.

One object of the present invention is to provide an apparatus for separating a light beam into three light beams having different colors (wavelengths) by using two flat plates with an air gap therebetween and a hybrid dichroic mirror.

Another object of the present invention is to provide a method of light separation by using two flat plates with an air gap therebetween and a hybrid dichroic mirror.

According to one embodiment of the present invention, a light separation apparatus includes a first dichroic mirror allowing only a light beam with a first wavelength to penetrate and reflecting light beams with other wavelengths, the light beams with the first wavelength and the other wavelengths being admitted into the apparatus from a light source; a wide band high-reflection mirror reflecting the light beam reflected from the first dichroic mirror through a material, the wide band high-reflection mirror being positioned such that it is parallel to the first dichroic mirror and spaced from the first dichroic mirror a predetermined distance; a second dichroic mirror allowing only a light beam with a second wavelength different from the first wavelength to penetrate in a direction that is parallel to the light beam with the first wavelength penetrated through the first dichroic mirror and reflecting light beams with other wavelengths through the material from the light beam reflected by the wide band high-reflection mirror; the wide band high-reflection mirror reflecting the light beam which is reflected by the second dichroic mirror through the material and past the second dichroic mirror in a direction that is parallel to the light beam with the second wavelength penetrated through the second dichroic mirror; and wherein the material is air or gas, which is positioned between the first, second dichroic mirrors and the wide band high-reflection mirror and through which the incident light beam and the reflected light beams pass.

According to one embodiment of the present invention, the incident light beam is white-light and the first, second, and third wavelengths are wavelengths having blue, green, and red colors, respectively.

According to one embodiment of the present invention, a method of light separation for separating an incident light beam having multiple wavelengths admitted from a light source includes the steps of allowing only a light beam with a first wavelength to penetrate outside a material through a first means and first-reflecting, by the first means, light beams with other wavelengths within the material; second-reflecting the first-reflected light beams within the material using a second means; allowing only a light beam with a second wavelength different from the first wavelength to penetrate outside the material through a third means in a direction that is parallel to the light beam with the first wavelength which had penetrated through the first means and third-reflecting a light beam with a third wavelength different from the first and second wavelengths within the material using the third means; and reflecting, by the second means, the light beam with the third wavelength through the material past the third means in a direction that is parallel to the light beam with the second wavelength which had penetrated through the third means.

The apparatus according to the present invention can be used for light separation in a light separation apparatus which is used in a method of image projection that modulates light independently by a 3-channel acousto-optic modulator operating according to an image signal from each color and projects the modulated images with each single color of red, green, and blue on a screen. In addition to the above example, the apparatus of the invention can be in widely used, such as in color scanners, color copiers, etc.

BRIEF DESCRIPTION OF THE DRAWINGS

Other objects and advantages of the invention will become apparent upon reading the following detailed descriptions and upon reference to the drawings.

Figure 1:
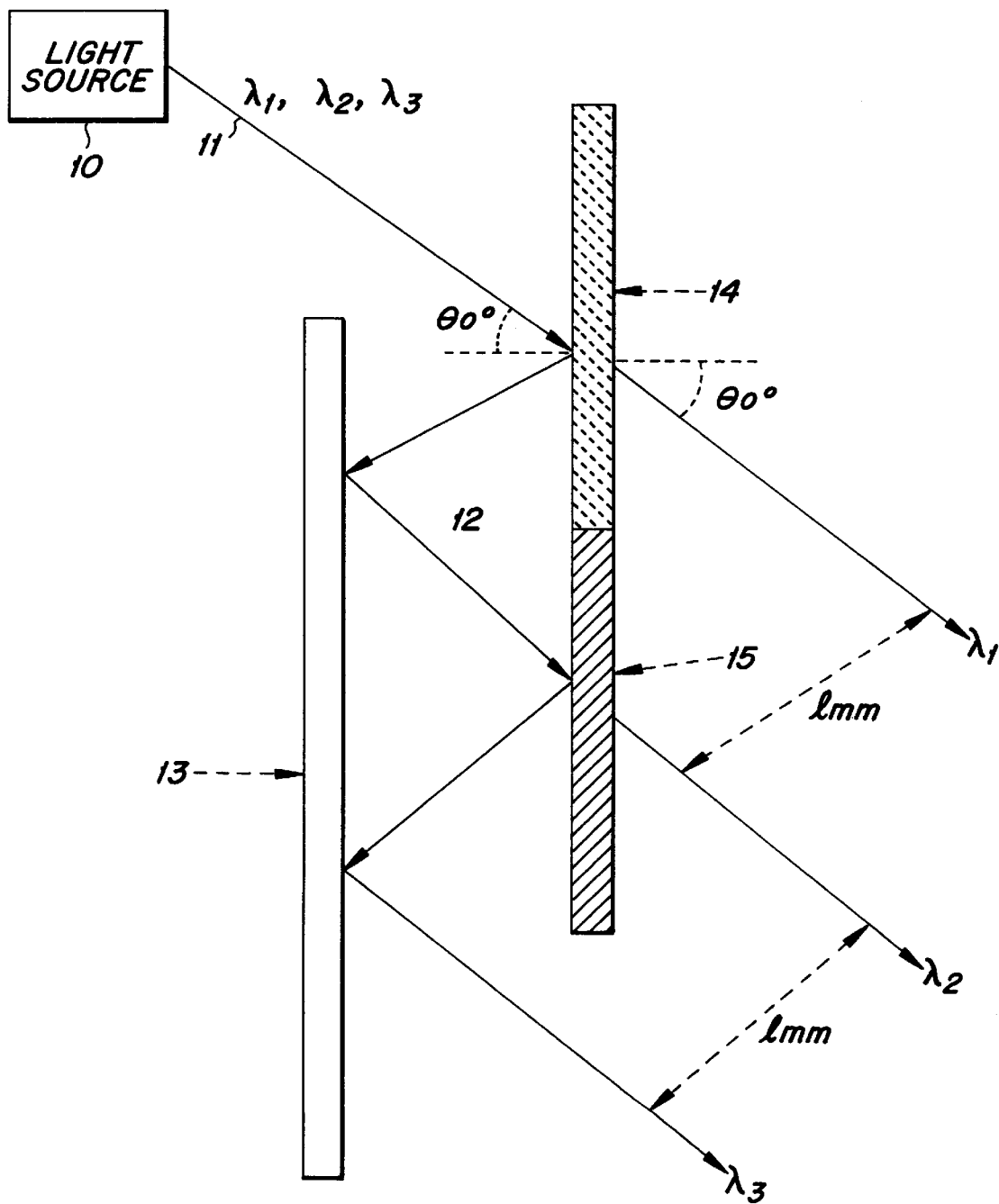
FIG. 1 illustrates a general structure of a light separation apparatus using an air gap between two flat plates according to one embodiment of the present invention.

The descriptions of important symbols used in the above drawings are as follows:

10: light source
11: white-light beam
12: air gap
13: wide band high-reflection coating film
14: first dichroic mirror coating film
15: second dichroic mirror coating film While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The invention will be explained in detail through the drawings.

The light separation apparatus of the present invention is comprised of a first dichroic mirror (14) allowing only a light beam with a first wavelength $\lambda_1$ to penetrate and reflecting light beams with other wavelengths from the incident light beam generated by a light source; a wide band high-reflection mirror (13) reflecting the light reflected from the first dichroic mirror within a material; a second dichroic mirror (15) allowing only a light beam with a second wavelength $\lambda_2$ different from the first wavelength to penetrate in a direction that is parallel to the light beam with the first wavelength penetrated through the first dichroic mirror and reflecting a light beam with a third wavelength different from the first and second wavelengths within the material, from the light beam reflected from the wide band high-reflection mirror; the wide band high-reflection mirror (13) reflecting the light beam with the third wavelength which is reflected from the second dichroic mirror such that the light beam with the third wavelength passes through the material past the second dichroic mirror in a direction that is parallel to the light beam with the second wavelength penetrated through the second dichroic mirror, the wide band high-reflection mirror (13) being positioned such that it is parallel to the first dichroic mirror and the second dichroic mirror and spaced therefrom by a predetermined interval; and wherein the material is air or gas, which is positioned in the space between the first and second dichroic mirrors and the wide band high-reflection mirror, and through which the incident light beam and the reflected light beams pass.

The first dichroic mirror and the second dichroic mirror are maintained at an equal distance from the wide band high-reflection mirror by the material, and they are parallel to the wide band high-reflection mirror. According to the present invention, the material is air or gas.

The present invention relates to a method, in which the white-light, entering the system having the above two flat plate planes (the plane made of a wide band high-reflection mirror and the plane made of the first and second dichroic mirrors) with an air gap between the planes, is separated into three light beams having three colors automatically. This method has advantages in that the system can be made compact and supplied at a low price. Additionally, when using three dichroic mirrors in the prior art method, it is difficult to align the light beams. In contrast, in the system according to the present invention, the light beams are aligned automatically if the flatness and parallelism of only two flat plate planes is prepared and the alignment of two flat plate planes is provided.

FIG. 1 shows the structure of the general composition of a system illustrating light separation using two flat plates according to one embodiment of the present invention. According to one embodiment of the present invention, the two flat plates are formed of a white-light transparent material. Additionally, according to one embodiment of the present invention, the light source is a laser light source that generates a white-light laser beam.

FIG. 1 illustrates a light source (10), a white-light beam (11) generated by the light source (10), an air gap (12), a wide band high-reflection coating film (13), and dichroic mirror coating films forming dichroic mirrors (14, 15).

In FIG. 1, white-light (11) from the light source (10) enters the system at an incident angle ($\theta_0$) and reaches a point B (FIG. 2) of the first dichroic mirror (14), which allows the light beam with blue wavelengths ($\lambda_1$) to penetrate completely and reflects a light beam with green wavelengths ($\lambda_2$) and a light beam with red wavelengths ($\lambda_3$). The green-wavelength light beam and the red-wavelength light beam reflected by the first dichroic mirror are totally reflected by the wide band high-reflection mirror (13). This reflected light beam then hits the second dichroic mirror (15), which allows only the green-wavelength light beam to penetrate and reflects the red-wavelength light beam. The red-wavelength light beam separated by the second dichroic mirror (15) hits the wide band high-reflection mirror (13) again and is then totally reflected, passing through the material and outside the apparatus past the second dichroic mirror.

According to one embodiment of the present invention described above, the first wavelength, the second wavelength, and the third wavelength are a wavelength having a blue color, a wavelength having a green color, and a wavelength having a red color, respectively. It is within the skill of the ordinary artisan to configure the system so that each of the first, second and third wavelengths can have any of the three colors, red, green, or blue.

The wide band high-reflection mirror (13) is a coating film formed on one of the two flat plates. The first and second dichroic mirrors (14, 15) are coating films formed on the other flat plate, adjacent one another. The two flat plates are positioned spaced apart from one another, with a material between them. The flat plate having the two dichroic mirrors (14, 15) is positioned slightly above the flat plate with the wide band high-reflection coating film (13), so that an incident light beam, coming from an opposite side of the flat plate with the wide band high-reflection coating film (13) with respect to the flat plate with the dichroic mirrors (14, 15), hits the first dichroic mirror (14) first.

Figure 2:
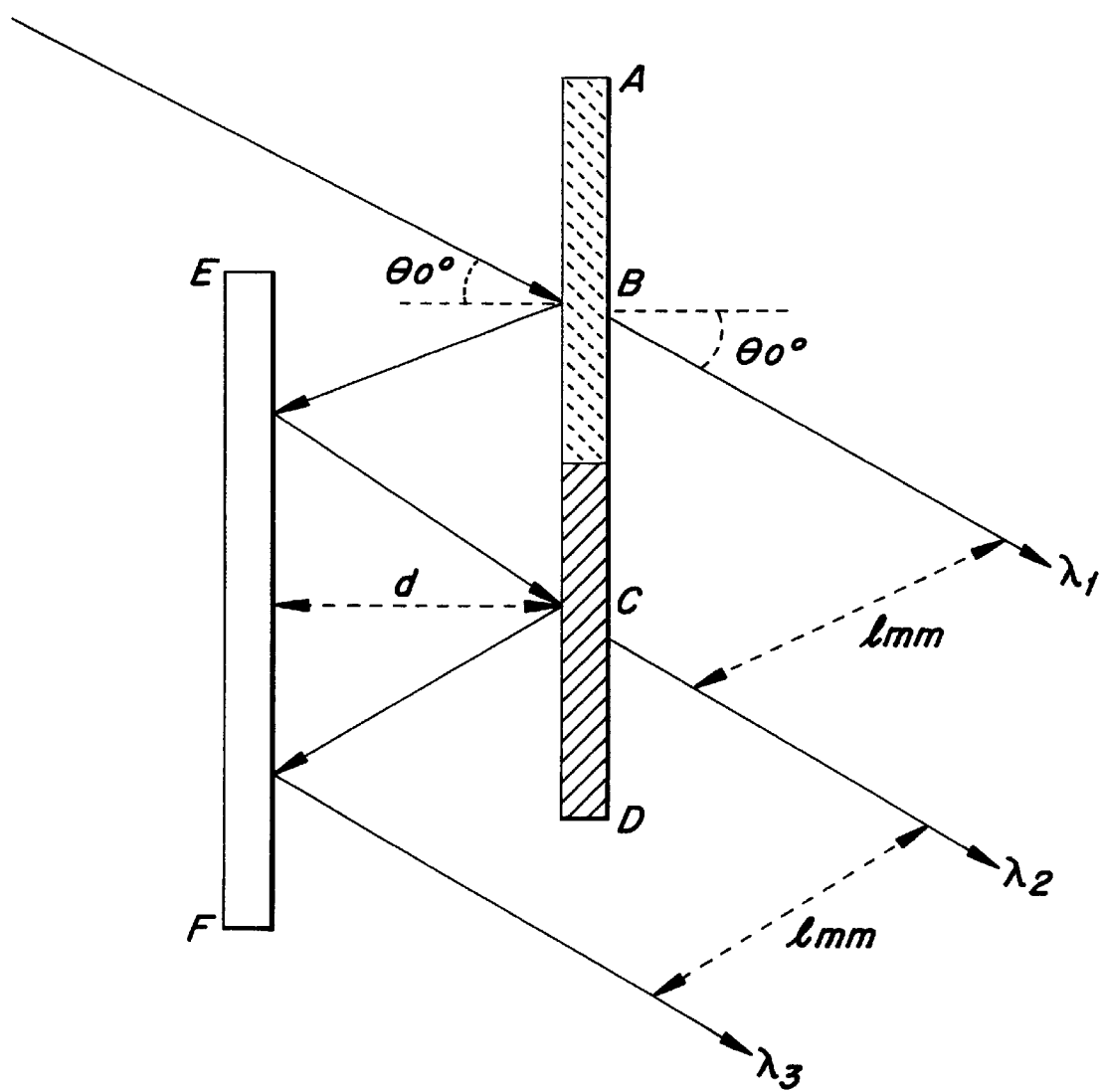
FIG. 2 illustrates the size of the light separation apparatus using two flat plates according to one embodiment of the present invention.
Figure 3:
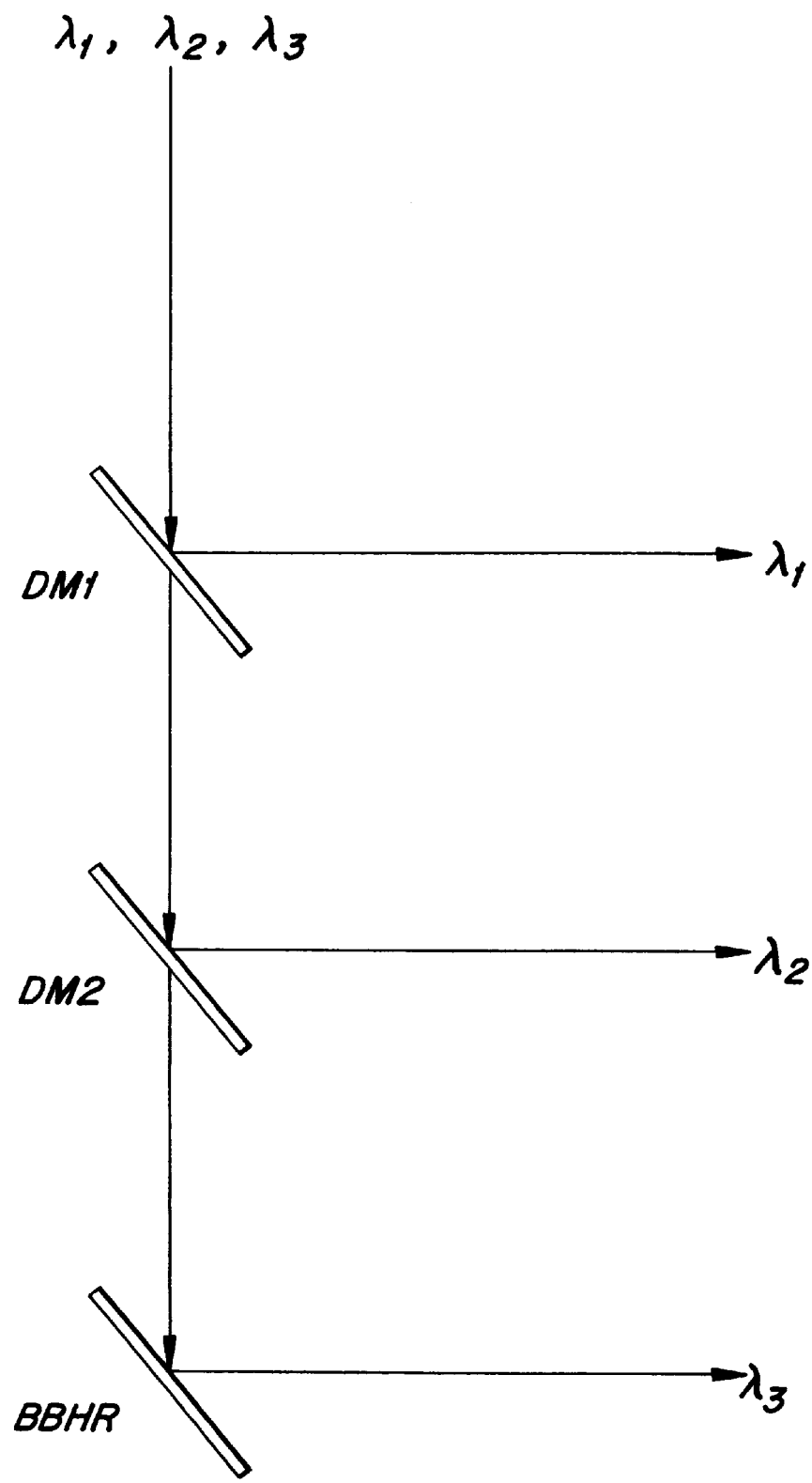
FIG. 3 illustrates a general structure of one conventional means of light separation.

According to one embodiment of the present invention, the size of system is determined as follows. In FIG. 2, if the incident light beam enters at an angle of $\theta_0$ degrees, and an interval 1 mm is maintained between each separated light beam having blue, green, and red wavelengths ($\lambda_1, \lambda_2, \lambda_3$), respectively, the interval between the flat plate is calculated as expression 1, and the lengths of the flat plates AD and EF are calculated as expression 2.

$d = l \cos \theta_0$  Expression 1

$\overline{AD} = \overline{EF} = 4\, l \sin \theta_0$  Expression 2

For example, when l is 5 mm and $\theta_0$ is 30°, the length AD and the length EF are 10 mm. This means that the system according to the present invention can be reduced up to fifteenth times in size compared with at least 150 mm required in the prior art light separation system using the three individual elements.

According to one embodiment of the present invention, a method of light separation of an incident light beam having multiple wavelengths admitted into an apparatus from a light source comprises the steps of allowing only a light beam with a first wavelength to penetrate outside a material through a first means and first-reflecting, by the first means (14), light beams with other wavelengths within the material, the material being air or gas; second-reflecting the first-reflected light beam within the material using a second means (13); allowing only a light beam with a second wavelength different from the first wavelength to penetrate outside the material through a third means (15) in a direction that is parallel to the light beam with the first wavelength which has penetrated through the first means (14) and third-reflecting a light beam with a third wavelength different from the first and second wavelengths within the material using the third means (15); and reflecting the light beam with the third wavelength through the material and past the third means (15) in a direction that is parallel to the light beam with the second wavelength which has penetrated through the third means (15).

According to one embodiment of the present invention, the thickness of the material, for example, air, should be uniform so that the interval between the light beam with the first wavelength after it penetrates the first dichroic mirror (14) and the light beam with the second wavelength after it penetrates the second dichroic mirror (15) is equal to the interval between the light beam with the second wavelength after it penetrates the second dichroic mirror (15) and the light beam with the third wavelength after it passes outside the system past the second dichroic mirror (15). As the incident light beam according to the present invention, a light beam with multiple wavelengths such as wavelengths with red color, wavelengths with green color, and wavelengths with blue color can be used.

As stated above, according to the present invention, the composition of the system is simple compared to the composition of prior light separation sub-systems, the size is compact, and the alignment of the light separated into three colors is performed automatically, so composition and use become easy. Therefore, the present invention can be used for displaying a large-area image by projecting the image directly on a screen with a compacted optical system. Further, the system according to the present invention is very effective for simplifying light separation systems such as a light separation subsystem of a color printer.

We claim:

1. An apparatus for separating an incident light beam generated by a light source into three light beams having first, second, and third wavelengths different from one another using two flat plates comprising:

a material disposed between the two flat plates, the material being one of air or gas;

a first dichroic mirror formed on a first one of the two flat plates for allowing only a light beam with the first wavelength from the light beam generated by the light source to penetrate and reflecting light beams with other wavelengths from the light beam generated by the light source;

a wide band high-reflection mirror formed on a second one of the two flat plates for reflecting the light beam reflected from the first dichroic mirror within the material;

a second dichroic mirror formed on the first one of the two flat plates for allowing only a light beam with the second wavelength to penetrate in a direction that is parallel to the light beam with the first wavelength penetrated through the first dichroic mirror and reflecting the light beam with the third wavelength within the material from the light beam reflected from the wide band high-reflection mirror;

the wide band high-reflection mirror reflecting the light beam which is reflected by the second dichroic mirror within the material and past the second dichroic mirror without passing through the second dichroic mirror, in a direction that is parallel to the light beam with the second wavelength penetrated through the second dichroic mirror, the wide band high-reflection mirror being positioned such that it is parallel to the first mirror and the second dichroic mirror and spaced therefrom by a predetermined interval; and wherein the incident light beam and the reflected light beams pass through the material, which is positioned between the first, second dichroic mirrors and the wide band high-reflection mirror, and wherein the flat plate having the first and second dichroic mirrors is positioned above the flat plate with the wide band high-reflection mirror, so that the incident light beam, coming from a direction opposite to the flat plate with the wide band high-reflection mirror with respect to the flat plate with the first and second dichroic mirrors, hits the first dichroic mirror first.

2. An apparatus for separating an incident light beam as set forth in claim 1, wherein the incident light beam is white-light and the first, second, and third wavelengths are wavelengths having blue, green, and red colors respectively.

3. An apparatus for separating an incident light beam as set forth in claim 1, wherein the thickness of the material is uniform so that an interval between the light beam with the first wavelength after it penetrates the first dichroic mirror and the light beam with the second wavelength after it penetrates the second dichroic mirror is equal to an interval between the light beam with the second wavelength after it penetrates the second dichroic mirror and the light beam with the third wavelength after it passes the second dichroic mirror.

4. An apparatus for separating an incident light beam as set forth in claim 1, wherein the wide band high-reflection mirror is a coating film formed on one of the two flat plates, the first and second dichroic mirrors are coating films formed on the other flat plate, adjacent one another, and the two flat plates are positioned spaced apart from one another, with the material between them.

5. A method of separating an incident light beam generated by a light source into three light beams having first, second and third wavelengths different from one another using two flat plates comprising the steps of:

allowing only a light beam with the first wavelength from the light beam generated by the light source to penetrate outside a material through a first reflecting means and first-reflecting, by the first reflecting means, light beams with other wavelengths from the light beam generated by the light source within the material;

second-reflecting, by a second reflecting means, the first-reflected light within the material;

allowing only a light beam with the second wavelength to penetrate outside the material through a third reflecting means in a direction that is parallel to the light beam with the first wavelength which was penetrated through the first reflecting means and third-reflecting, by the third reflecting means, the light beam with a third wavelength within the material; and reflecting, by the second reflecting means, the light beam with the third wavelength within the material and past the third reflecting means, without passing through the third reflecting means, in a direction that is parallel to the light beam with the second wavelength which has penetrated through the third reflecting means; and wherein the material is air or gas, and wherein a flat plate including the first and third reflecting means is positioned above a flat plate with the second reflecting means, so that the incident light beam, coming from a direction opposite to the flat plate with the second reflecting means with respect to the flat plate with the first and third reflecting means, hits the first reflecting means first.

6. A method of separating an incident light beam as set forth in claim 5, wherein the incident light beam is white-light and the first, second, and third wavelengths are wavelengths having blue, green, and red colors respectively.

* * * * *